Dec. 26, 1967  H. KOCK  3,359,936
HYDROFOIL
Filed June 23, 1966
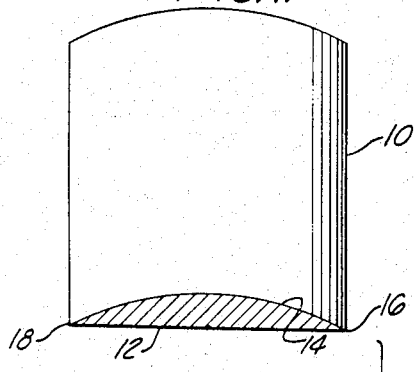
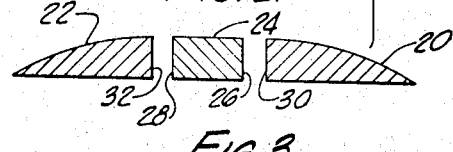
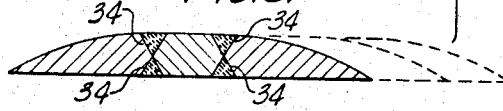
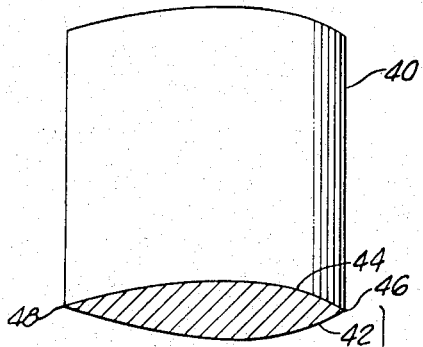
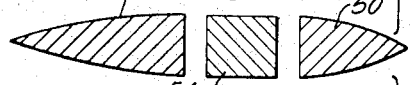
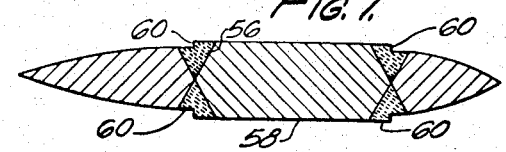
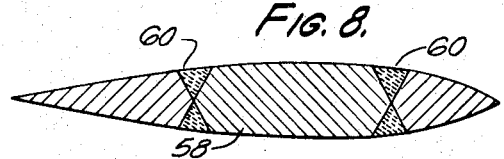
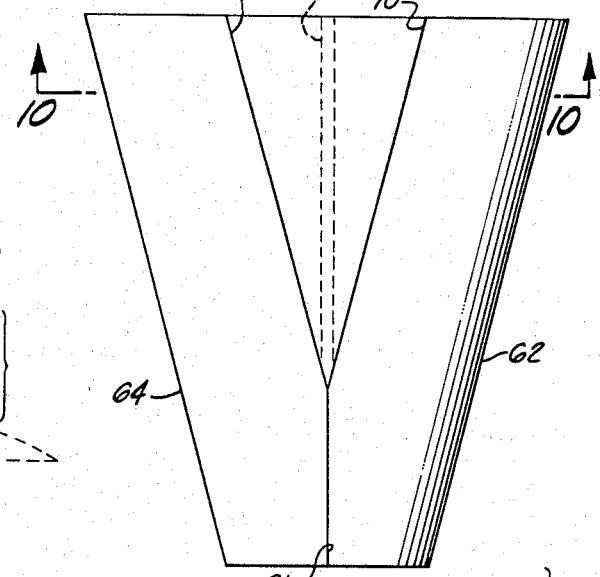
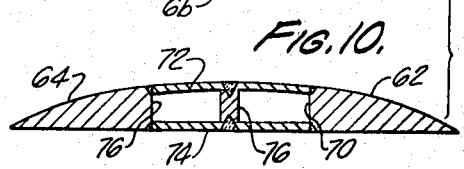
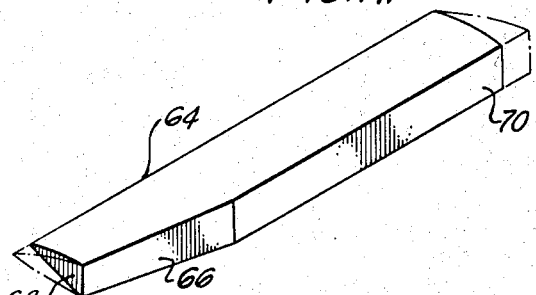
INVENTOR.
HELMUT KOCK
BY Lyon+Lyon
ATTORNEYS United States Patent Office 3,359,936
Patented Dec. 26, 1967

3,359,936
HYDROFOIL
Helmut Kock, Woodlyn, Pa., assignor to
Wilson Shipyard, Inc.
Filed June 23, 1966, Ser. No. 559,974
2 Claims. (Cl. 114—66.5)

ABSTRACT OF THE DISCLOSURE

A hydrofoil having first and second metal extrudates forming the leading and lagging edges thereof and joined by an intermediate plate that may be used to impart a taper thereto.

---

This application is a continuation-in-part of application Ser. No. 335,574, filed Jan. 3, 1964, the disclosure of which is expressly incorporated herein by reference.

This invention relates to hydrofoils and more particularly relates to a method of forming a hydrofoil and the article formed thereby.

It is often required that a hydrofoil be constructed of several different parts, each having a number of different profiles along its length, that is, that the width of the part and its thickness vary in different areas of the foil. Such hydrofoil parts are generally made of aluminum, the aluminum being extruded to form a suitably shaped article having a width and thickness equal to the maximum dimensions required and then machined along its length to the desired contour and shape. Such machining, of course, requires a considerable amount of work, entails the use of very complex and costly machinery, and results in the wasting of a substantial amount of material. It has also been proposed to extrude the entire tapered foil or a part thereof, and while this is possible, the extruding apparatus is very complex and expensive. Moreover, many different types of hydrofoil structures are required, and the cost of providing the special dies and equipment for extruding all of them is prohibitive.

According to the present invention, it has now been found that the various parts of a hydrofoil structure may be constructed using a small number of easily extrudable articles and a plurality of differently shaped cooperating plates. Once an article of suitable shape has been extruded, it is split along its length, and a plate of suitable configuration is disposed between the two sections of the article. The sections are then welded to the plate with the result that a complete hydrofoil part is formed without the use of any complex or special equipment or the wasting of a significant amount of material.

It is therefore an object of the present invention to provide a method of forming a hydrofoil.

It is also an object of the present invention to provide a method of forming a hydrofoil or a hydrofoil part having different profiles along its length.

It is another object of the present invention to provide a method of forming a hydrofoil or hydrofoil part by splitting an extruded article and disposing a suitably shaped plate between the split sections.

It is a further object of the present invention to provide a new and improved hydrofoil construction.

These and other objects and advantages of the present invention will become more apparent upon reference to the accompanying description and drawings in which:

FIGURE 1 is a perspective view of a first form of elongated extruded article;

FIGURE 2 is a sectional view of the article of FIGURE 1 after it has been split lengthwise and a suitably shaped plate disposed between the two resulting sections;

FIGURE 3 is a sectional view of a hydrofoil part formed by welding together the three pieces of FIGURE 2;

FIGURE 4 is a perspective view of a second form of elongated extruded article;

FIGURE 5 is a sectional view of the article of FIGURE 4 after it has been split in two sections and a suitably shaped plate disposed between the two resulting sections;

FIGURE 6 is a sectional view of a hydrofoil part formed by welding together the three pieces shown in FIGURE 5;

FIGURE 7 is a sectional view of a structure formed by inserting a plate between the two split sections of the article of FIGURE 4, the plate having a greater thickness than the maximum thickness of the article;

FIGURE 8 is a cross sectional view of a hydrofoil formed by machining down the central plate of FIGURE 7 to obtain a smooth contour;

FIGURE 9 is a top plan view of a hydrofoil formed according to the teachings of the present invention;

FIGURE 10 is a sectional view taken along lines 10—10 of FIGURE 9; and

FIGURE 11 is a perspective view of a section of an extruded article such as shown in FIGURE 1 after it has been adapted for use in a hydrofoil such as that shown in FIGURE 9.

Referring now to FIGURES 1 through 3, there is shown three stages in a first method of making a hydrofoil according to the present invention. In FIGURE 1 there is shown an elongated extruded article 10, preferably of aluminum. As shown, this article is, in cross section, a circular sector defined by a bottom planar surface or chord 12, a top curved surface or camber 14 and leading and trailing edges 16 and 18. In the article shown, the greatest thickness is located at the midpoint of the planar surface of chord 12. It should be obvious, however, that this area of greatest thickness can be located either forward or behind this midpoint.

In order to form a hydrofoil having a longer chord than the extruded article 10 (which could itself be used as a hydrofoil), the article 10 is split lengthwise along the plane of greatest thickness. Preferably, the splitting plane is perpendicular to the chord or planar surface 12 joining the leading and trailing edges 16 and 18. After the article 10 has been split into two sections 20 and 22, a suitable solid plate 24 is disposed between them. This plate 24 may be rectangular in cross section, the vertical sides 26 and 28 thereof being parallel to the split surfaces 30 and 32 of the sections 20 and 22, the plate 24 being of the same vertical dimension of the split surfaces 30 and 32.

Before the sections 20 and 22 and plate 24 are assembled, welding grooves 34 are formed in these members. The parts are then welded together, the groove being filled with welded metal. Grinding of the welds and fairing out of the surface completes the procedure of this construction. By providing the plate 24 with a taper along its length, the hydrofoil may be provided with a similar taper, the chord successively decreasing along its length. Such a hydrofoil is indicated in phantom in FIGURE 3.

Referring now to FIGURE 4, there is shown a second form of extruded article 40. This article has lower and upper curved surfaces or cambers 42 and 44 joining the leading edge 46 to the trailing edge 48. As can be seen from this figure, the thickest portion of this article occurs in a plane offset from the center of the article towards the front thereof. The process of forming a hydrofoil having a wider profile than the article 40 is similar to that described previously. The article 40 is split lengthwise along the plane of greatest thickness to form two sections 50 and 52 and a suitable plate 54 is disposed between them. Suitable welding grooves 56 are then formed and the various parts welded together. As was the case with the plate 24, the plate 54 may be tapered to provide the hydrofoil with a changing profile over its length.

Referring now to FIGURE 7, there is shown a structure formed in a manner similar to the hydrofoil of FIGURE 6 with the exception that the plate 58 inserted between the sections 50 and 52 is thicker than the greatest thickness of these sections. By providing such a thicker plate, a hydrofoil having a continuous curvature can be formed as is shown in FIGURE 8. In this figure, the plate 58 and welding material 60 in the welding grooves 56 has been machined and faired to obtain the continuous curved surface.

Referring now to FIGURE 9, there is shown another form of hydrofoil part constructed according to the present invention. In this embodiment of the invention, an extruded article similar to that shown at 10 is split into two sections 62 and 64 as previously described. However, in this embodiment, the two sections are not positioned in parallel relation but are rather disposed at an angle to each other. For this purpose, a portion of each section at the intersecting end is removed along a plane running at an angle to the original cut. This leaves a split surface 66 angling away from the center of the section to the edge thereof. As a result of this cut, the maximum thickness of the end surface 68 of this section will be less than the thickness of the longitudinally cut surface 70. The hydrofoil part is thus provided with both horizontal and vertical taper. The ends of the sections 62 and 64 are preferably squared off, the original section being shown in phantom in FIGURE 11.

After the sections 62 and 64 have been properly cut, a suitable triangular plate is disposed between them. This plate may, if desired, be a solid plate such as that previously described. In this event, it is preferred that the plate be made slightly thicker than the extruded article and then machined to proper size in the manner described in connection with FIGURES 7 and 8. Alternatively, a pair of thinner plates 72 and 74 and a reinforcing rib 76 may be used. As shown in FIGURE 10, the upper plate 72 continues the curvature of the sections 64 and 62 while the bottom plate 74 is flat. As in the other embodiments, the components are welded together to form the finished hydrofoil. The latter construction permits a considerable savings of material and weight over a solid central plate. It is obvious, of course, that this method of construction could also be used in place of the solid plates 24, 54 and 58 used in the previous embodiments, and that an article having both upper and lower curved surfaces could be used in the method described in connection with FIGURES 9 to 11.

From the foregoing description, it may be seen that the present invention provides improved methods of constructing hydrofoils or hydrofoil parts. By use of the present invention, a large number of differently shaped hydrofoil parts can be constructed from a minimum number of easily extrudable articles used in cooperation with plates that can easily be connected to the sections of the extruded articles after the extruded articles have been split in a desired manner. The present invention thereby eliminates the need for complex and costly equipment and keeps the amount of material wasted to a minimum.

The invention may be embodied in other specific forms not departing from the spirit of central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A hydrofoil structure comprising first and second shaped members;
   said first shaped member having first, second, third and fourth surfaces, said first surface being curved so that one end thereof meets one end of said second surface to form an edge, said third surface joining the other ends of said first and second surfaces along a portion of the length thereof, said fourth surface joining the other ends of said first and second surfaces along the remainder of the length thereof, said fourth surface running at an angle from said third surface toward said edge;
   said second shaped member having first, second, third and fourth surfaces, said first surface being curved so that one end thereof meets one end of said second surface to form an edge, said third surface joining the other ends of said first and second surfaces along a portion of the length thereof, said fourth surface joining the other ends of said first and second surfaces along the remainder of the length thereof, said fourth surface running at an angle from said third surface toward said edge;
   a plate tapered to a point positioned between said first and second shaped members adjacent to the third surfaces of each of said members the angle of taper of said plate being equal to the angle formed between said third and fourth surfaces of said members; and
   means adhering said plate to said first and second members and adhering the fourth surface of said first member to the fourth surface of said second member.

2. The structure of claim 1 wherein said first and second shaped members are portions of a metal extrudate.

References Cited
UNITED STATES PATENTS

| | | | |
|---|---|---|---|
| 2,230,393 | 2/1941 | Thomson | 244—124 |
| 2,493,139 | 1/1950 | Heath | 170—159 |
| 2,776,100 | 1/1957 | Brequet | 244—124 |

ANDREW H. FARRELL, *Primary Examiner.*

MILTON BUCHLER, *Examiner.*